Oct. 22, 1963  W. F. WARD  3,107,608
TWO POSITION INK ROLL BEARING SOCKET
Filed May 18, 1962  4 Sheets-Sheet 1

INVENTOR
William F. Ward
BY
ATTORNEY

Oct. 22, 1963  W. F. WARD  3,107,608
TWO POSITION INK ROLL BEARING SOCKET
Filed May 18, 1962  4 Sheets-Sheet 2

INVENTOR
William F. Ward
BY Thomas W. J. Clark
ATTORNEY

Oct. 22, 1963   W. F. WARD   3,107,608
TWO POSITION INK ROLL BEARING SOCKET
Filed May 18, 1962   4 Sheets-Sheet 3
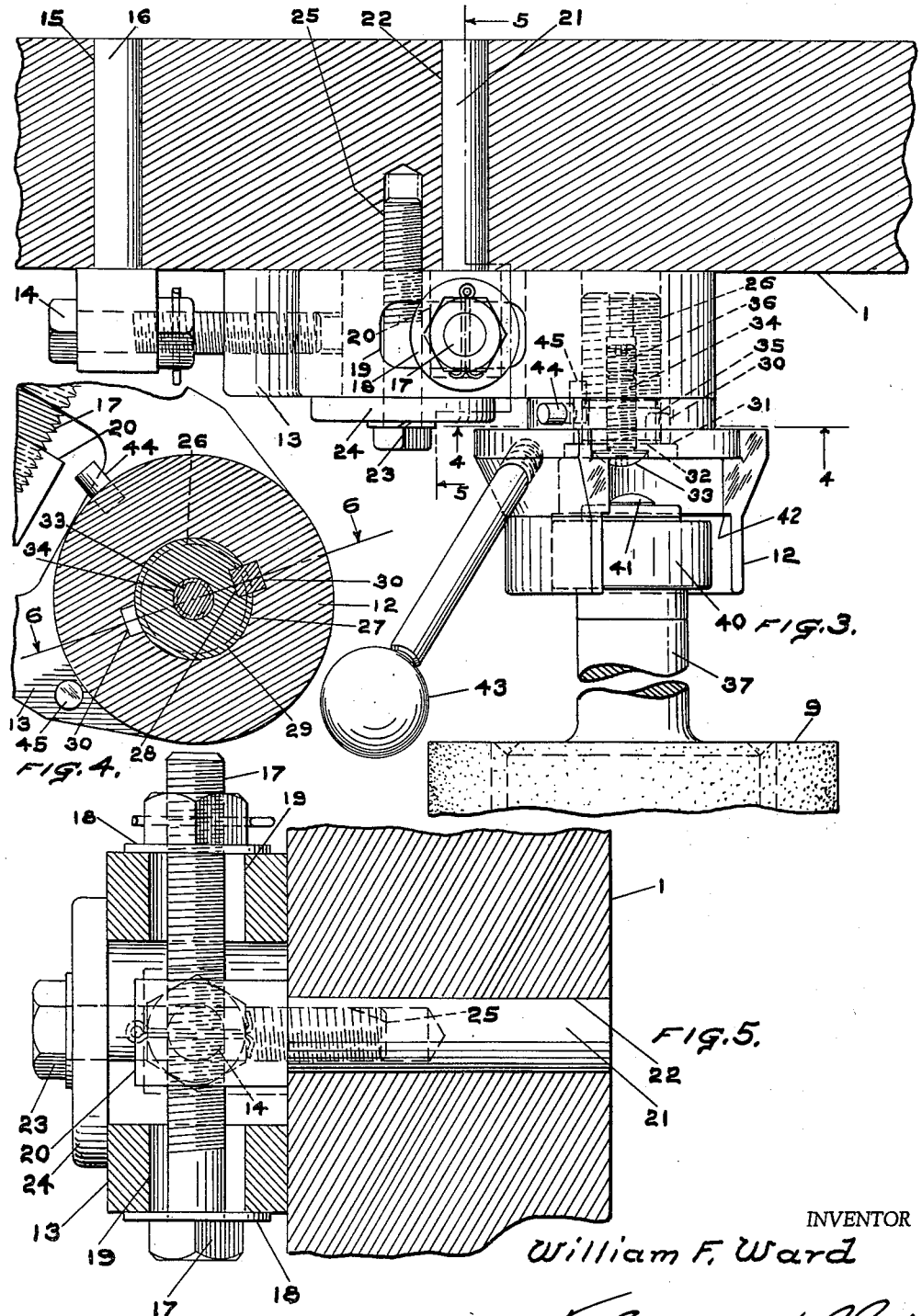
INVENTOR
William F. Ward
BY Thomas W. J. Clark
ATTORNEY

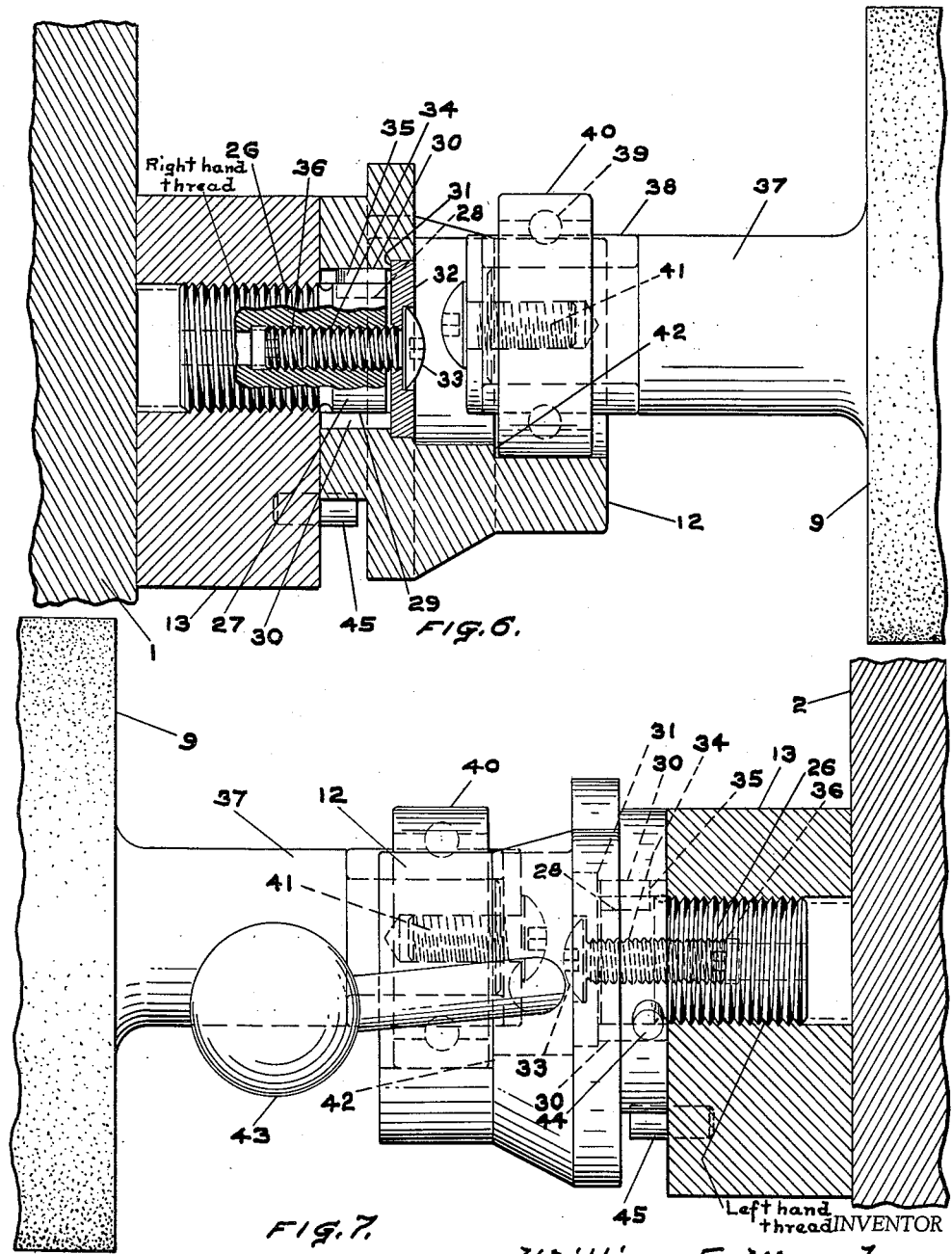

United States Patent Office 3,107,608
Patented Oct. 22, 1963

3,107,608
TWO POSITION INK ROLL BEARING SOCKET
William F. Ward, Baltimore, Md., assignor to Flynn & Emrich Company, Baltimore, Md., a corporation of Maryland
Filed May 18, 1962, Ser. No. 195,763
5 Claims. (Cl. 101—352)

This invention relates to an improvement in the mounting for the bearings of the rubber or composition roller which receives ink from an ink fountain on a printing machine such as a printer-slotter which is used for printing and slotting corrugated board for the making of corrugated boxes and other uses. It has heretofore been the practice to mount the composition roller, which contacts metal rollers on opposed sides or a metal roller and a printing cylinder on opposite sides, on a shaft having an outer cylindrical bearing raceway at each end clamped and held fast in the clamp by the tightening of a thumb screw when in operative position or released from the clamp to prevent deforming the composition roller or for cleaning.

One of the objects of the invention is to avoid the necessity of such a clamp which has at times been tightened to such a degree by hand pressure as to deform the outer raceway and so cause the destruction of the bearing at the end of the shaft. In the instant invention the outer raceway is simply fitted in to U-shaped or open sided socket which is turned to a position toward the oscillating roller and in that position the composition roller is retained in its sockets at each end of the shaft.

Another object of the invention is to mount each socket on an eccentric so that in one position when the open side of the socket is toward its opposite steel roller the socket holds the roller firmly in this position but when the socket is turned on its eccentric to turn the open sides away from the metal oscillating roller the composition roller may be turned by hand and cleaned at will and it will be free from contact with the steel roller so as not to be deformed by it when not in use or it may even be lifted out of the socket at each end. It will be apparent that many of the advantages of the invention will be available by mounting the sockets concentric, rather than eccentric as herein described.

Another object of the invention is to mount the sockets holding the composition roller on screws threaded into the adjuster plate on the inside of each side frame of the machine and the base of the socket and the vertical face of the adjuster plate are so aligned that when the screw holds the socket close against the adjuster plate the socket is solidly in place to hold the socket with its open side toward the metal roller and when the screw is unscrewed by rotating the socket then the composition roller is removed from the metal roller for the purposes intended. Mounting the socket so that the screw moves the socket squarely against the adjuster plate face squares the socket, providing a rigid mounting for the roller.

Another object of the invention is to make the screw at the base of the socket on a stud which is rigidly but detachably fixed in the socket so that the screw may be turned on its axis relative to the socket and the open side of the socket and firmly locked in place when so turned so that the flush locking of the socket against the adjuster plate can be effected at any desired position to assure the sockets are locked in place when their open sides are toward the metal roller.

Other objects and advantages of the invention will be apparent from the following description and the accompanying drawings forming a part hereof and in which:

FIGURE 3 is a sectional view through the left side frame of the printer-slotter showing the socket and its mounting mechanism in side elevation mounted on the side frame.

FIGURE 4 is a sectional view on line 4—4 of FIGURE 3 with the adjuster plate at the angle shown in FIGURE 2.

FIGURE 5 is a sectional view on line 5—5 of FIGURE 3 looking in the direction of the arrows.

FIGURE 6 is a sectional view on line 6—6 of FIGURE 4 showing the end of the composition roller and its mounting bearing.

FIGURE 7 is a view of the right end of the roller and socket mounting showing in section the adjuster plate and right hand frame member of the machine.

Figure 1:
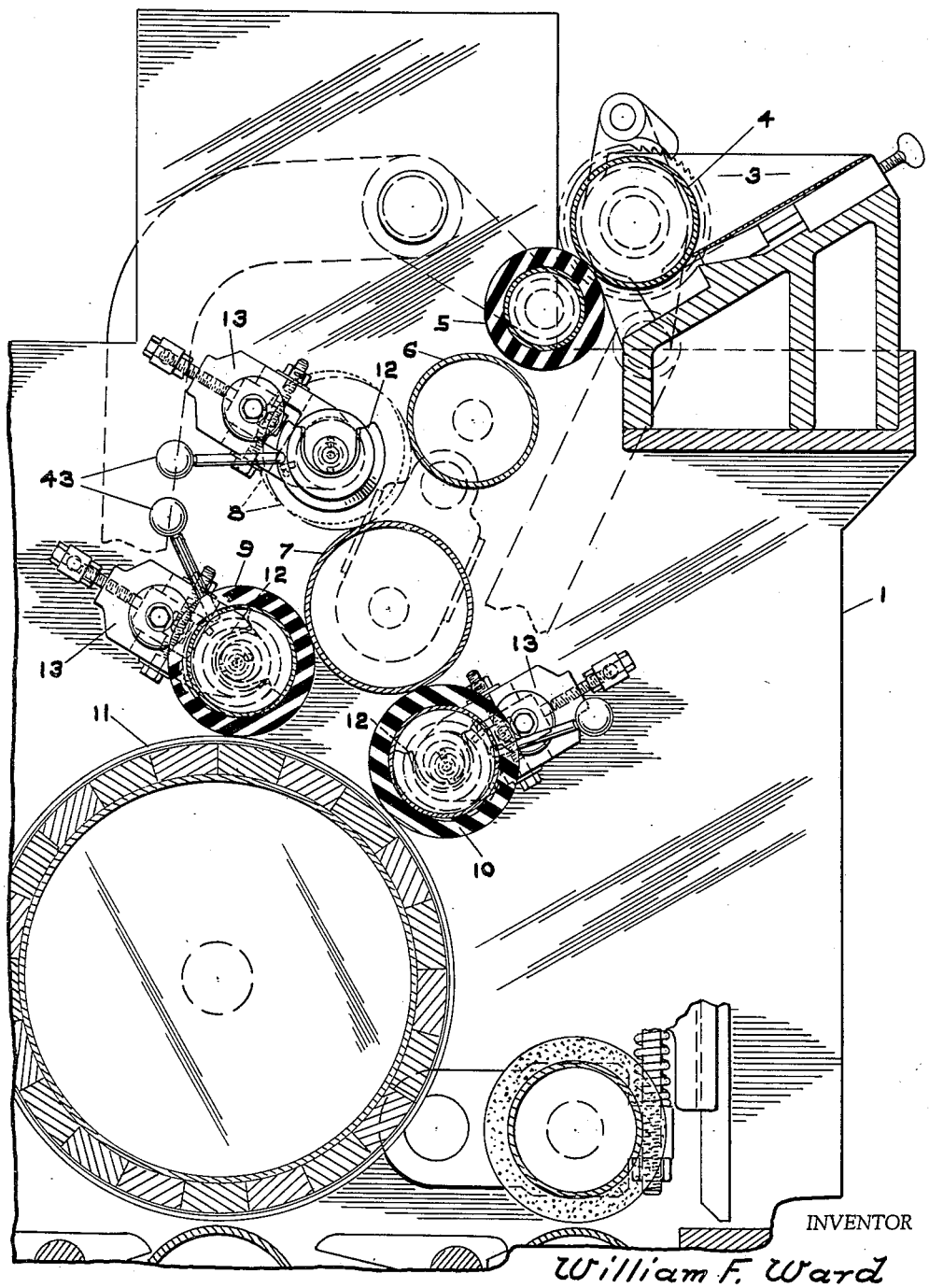
FIGURE 1 is a longitudinal sectional view of the ink distributing mechanism of a printer-slotter.

In the drawings similar numerals refer to similar parts throughout the several views. The printer-slotter has left and right frame members 1 and 2 respectively, whether they are termed left or right depending on the position of the operator as he faces the bank of rollers in preparation for adjusting the composition roller or removing these rollers from their contact with the metal rollers for cleaning or other purposes. The printer-slotter is equipped with an ink fountain 3 having therein a feed roller 4, the ductor roller 5, adjoining this the upper oscillator 6 and main oscillator or vibratory metal roller 7 and distributor rollers 8, 9 and 10, the printing cylinder being indicated at 11. The distributor rollers are rubber or composition material and when the machine is not operating they should be removed from contact with the metal rollers to avoid their deformation and this removal is also desirable for their cleaning and change of color of ink or possible replacement.

Figure 2:
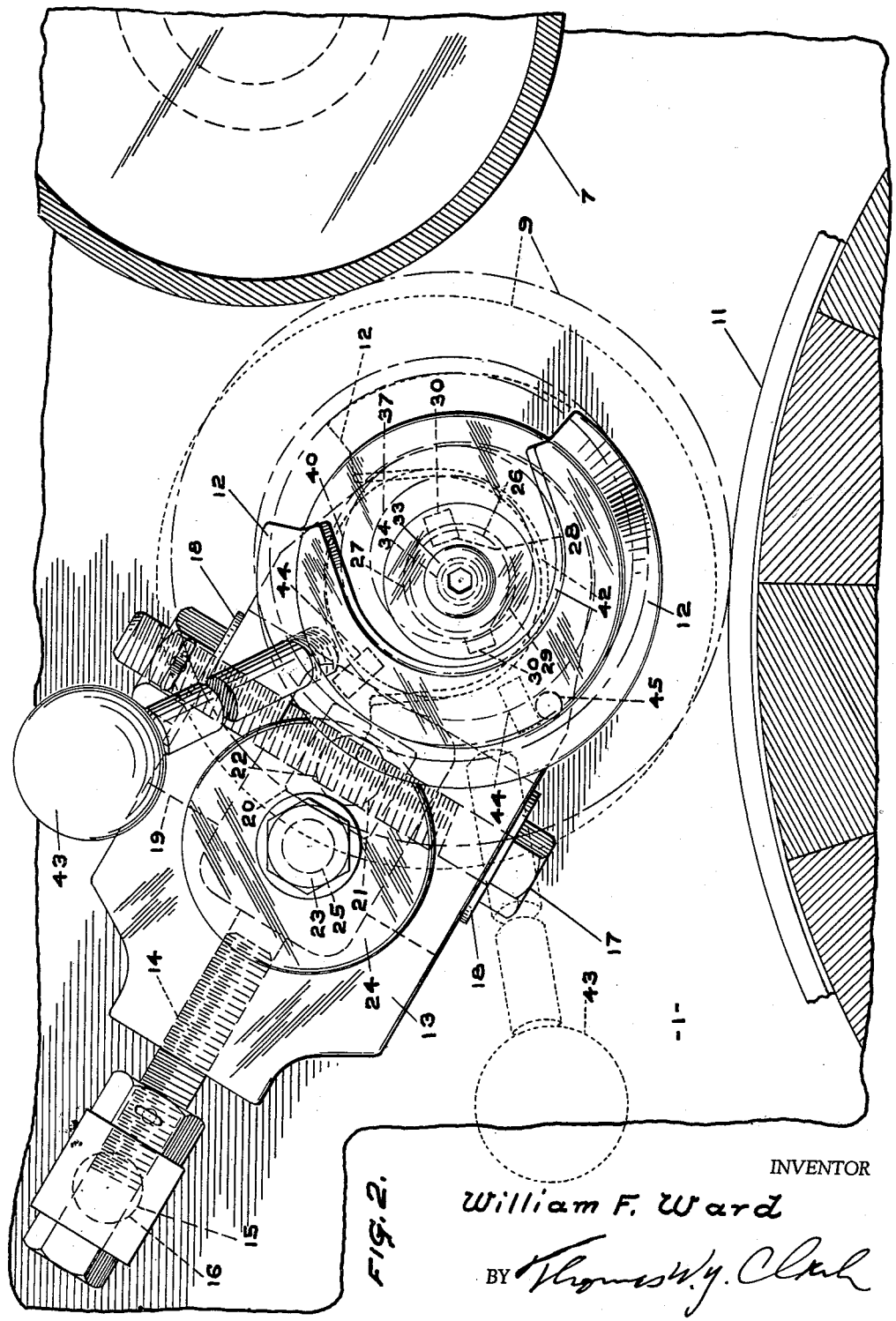
FIGURE 2 is an end elevational view of one of the sockets and its mounting with the adjacent rollers of the printer-slotter being shown sectionally.

The distributor rollers are mounted in sockets 12 which are U-shaped or open-sided as illustrated. The adjuster plates 13 are mounted on the side frames of the machine by means of a swivel adjusting screw 14 passing through the head of stud 15 which fits snugly into opening 16 in the side frame. The adjusting screw 14 moves the adjuster plate lengthwise as clearly shown in FIGURE 2. The adjusting screw 17 having washers 18 at each end goes through the enlarged opening 19 in the adjuster plate and it has adjacent its center the enlarged threaded end 20 of stud 21 likewise fitting snugly in an opening 22 in the side frame. Rotation of adjusting bolt 17 moves the adjuster plate from side to side so that the roller mounted in the sockets 12 at each end can be adjusted to accurate contact with the adjacent rollers 7 and 11 as illustrated by the broken line in FIGURE 2. After the proper adjustment of the adjuster plate 13 has been obtained, it is locked in place by means of the bolt 23 passing through large washer 24 and into the threaded opening 25 in the side frame. Tightening the bolt rigidly holds the adjuster plate on the side frame.

Th socket 12 is attached to the adjuster plate 13 by means of the stud 26 which is threaed at one end and is cylindrically shaped as at 27 at the other end, and it has a single keyway 28 in its side. The rounded end 27 of the stud fits closely into an opening 29 in the base of the socket 12. This opening has opposed keyways 30 therein. The opening 29 likewise has a shoulder 31 facing the socket. Into the opening 29 and resting on shoulder 31 is a washer 32 having cap screw 33 passing therethrough into threaded opening 34 in the center of the stud 26. When a key 35 is placed in the keyways between the stud and socket base, the stud will be rotated with the socket and when the cap screw 33 with its attached washer is tightened firmly in the stud, the stud and socket are rigidly attached. A set screw 36 is inserted into the threaded opening 34 from the threaded end 26 of the stud.

When this set screw is set firmly against cap screw 33, the cap screw is locked in place.

Roller 9 is mounted on shaft 37 having thereon an inner bearing raceway 38 with ball bearings 39 and a cylindrical outer or external raceway 40. The inner raceway of this bearing is held in place at the end of shaft 37 by means of screw 41. The inner edge of socket 12 has a shoulder 42 to limit end play of the external race 40 of the bearing and consequently end play of the roller 9. External raceway 40 fits snugly but removably into the open-sided or U-shaped socket 12.

The socket has a handle 43 connected thereto to facilitate its rotation with its stud 26 in the adjuster plate 13. It will be noted from FIGURE 6 in particular that the opening for the stud 26 is lower in the socket 12 so as to place the center of the bearing raceway 40 above the stud, or eccentric to the stud, as best shown in FIGURE 6. This eccentric is spaced from the open side of the socket. In use this open side should be adjusted toward the metal roller delivering ink to the composition roller carried in these sockets to pass the ink along to the next metal roller or the printing cylinder. In this manner the raceways of the composition roller are held securely within the sockets at each end of the roller without any additional clamps being required. Adjuster plates 13 are tapped right hand and left hand for proper clamping action. Right hand tapped plates always are at the left end of the composition roller as it is faced for release. As viewed in FIGURE 2 turning handle 43 counter-clockwise turns the open sided socket counter-clockwise and removes the roller 9 from the position shown in contact with the adjacent rollers 7 and 11 to the dotted line position shown in this figure. This turning of the handle 43 unscrews the attached stud 26 on the adjuster plate on the left hand frame of the machine as shown in FIGURE 6. The base of the socket has a radially projecting stop member 44 therein which registers with the axially projecting stop member 45 projecting from the vertical face of the adjuster plate 13. When these stop members are engaged as shown in the dotted position of FIGURE 2, the rotation of the socket is limited so that the roller shaft could not be dropped from the sockets.

To set the stud in proper position relative to the socket so that the base of the socket fits snugly against the vertical face of the adjuster plate, the adjuster plate is first properly located and the set screw 36 is substantially removed from its contact with the cap screw 33. Stud 26 is then screwed fully, just past its threads, into the adjuster plate and the key 35 is removed, so is cap screw 33 and washer 32. Socket 12 is then rotated beyond its locking position with its open sides beyond the center of the roller that it is intended to face until the keyways match. The key 35 is then placed in the matching keyways. Then the washer 32 and cap screw 33 are inserted but with the screw not yet tightened. The socket 12 is then rotated back to the desired locking position. Then cap screw 33 is securely tightened. Then the entire assembly including the adjuster plate 13 is removed from the side frame of the machine and the set screw 36 is tightened against the end of the scap screw 33 to insure its permanent setting. The adjuster plate with its accompanying socket is then placed on the side frame of the machine and the socket should then be in position with its base to fit snugly against its adjuster plate when the open side of the socket is placed toward the ink delivering roller. From this position the stud is unscrewed and the socket turned counter-clockwise to free the composition roller from its adjacent rollers as viewed in FIGURE 2. When this is done, it is clear that the socket moves away from its snug fit against its adjuster plate.

The invention is not limited to the particular details of construction herein referred to for the sake of explaining the general nature of the invention as said parts may be changed or modified in ways known to those skilled in the art without departing from this invention.

What is claimed as new and is desired to be secured by Letters Patent is:

1. In inking mechanism for printing presses, in which a plurality of rollers mounted in the side frames of the press transfer ink from one to the other, some of the rollers being metal and others composition, the composition rollers being mounted on shafts having external cylindrical bearing containing raceways on each end of their shafts, means to mount the bearing raceways for quick release and assembly of the composition rollers in relation to the adjacent metal rollers including vertically faced adjuster plates connected to the press side frames and open-sided sockets for said bearing raceways each having a base and a stud projecting normal therefrom threadedly engaging said adjuster plates, the base fitting flush against the vertically faced adjuster plates when the socket contained composition roller is in contacting relation with its adjacent metal roller and the open side of the socket is toward said metal roller, said studs being oppositely threaded into the adjuster plates and said sockets turning their open sides away from the metal roller upon unscrewing the studs.

2. The roller mounting of claim 1 in which said open-sided sockets are mounted eccentrically to said studs to space the socket contained composition roller from its adjacent metal roller upon unscrewing the studs.

3. The roller mounting of claim 1 including means to vary the rotary position of each stud relative to the open side of its respective socket when the base of the socket is flush with the supporting vertically faced adjuster plate.

4. The roller mounting of claim 1 including means to vary the rotary position of each stud relative to the open side of its respective socket when the base of the socket is flush with the supporting vertically faced adjuster plate and keyways in the stud and socket having a key therein to maintain the stud in fixed position relative to the open side of the socket.

5. The roller mounting of claim 1 including means to vary the rotary position of each stud relative to the open side of its respective socket when the base of the socket is flush with the supporting vertically faced adjuster plate, the socket base having an opening therethrough and in inwardly directed shoulder on the socket base in said opening, a washer supported on said shoulder and a cap screw passing through said washer and threaded concentrically into the stud to retain the stud and socket together.

References Cited in the file of this patent

UNITED STATES PATENTS

| 1,591,452 | White | July 6, 1926 |
|---|---|---|
| 1,816,948 | Wood | Aug. 4, 1931 |
| 2,048,366 | Ball | July 21, 1936 |
| 2,250,397 | Schmutz | July 22, 1941 |
| 2,635,539 | Peyrebrune | Apr. 21, 1953 |
| 2,861,516 | Harless | Nov. 25, 1958 |

FOREIGN PATENTS

| 684,035 | France | June 20, 1930 |
|---|---|---|
| 1,196,587 | France | Nov. 25, 1959 |